June 3, 1969     C. VAN DER LELY     3,447,787
APPARATUS FOR THE STORAGE AND SPREADING OF
LIQUID AND SEMI-LIQUID SUBSTANCES
Filed Jan. 24, 1967     Sheet 6 of 6
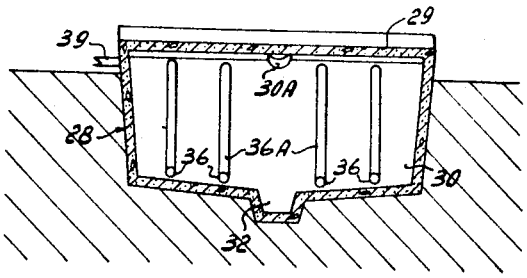
FIG. 12
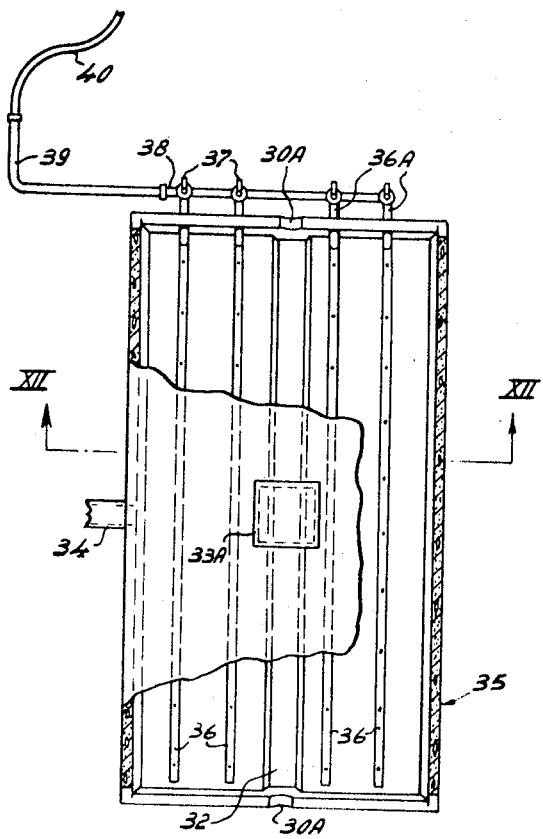
FIG. 11
FIG. 13
INVENTOR
CORNELIS VAN DER LELY
BY
Attorneys United States Patent Office 3,447,787
Patented June 3, 1969

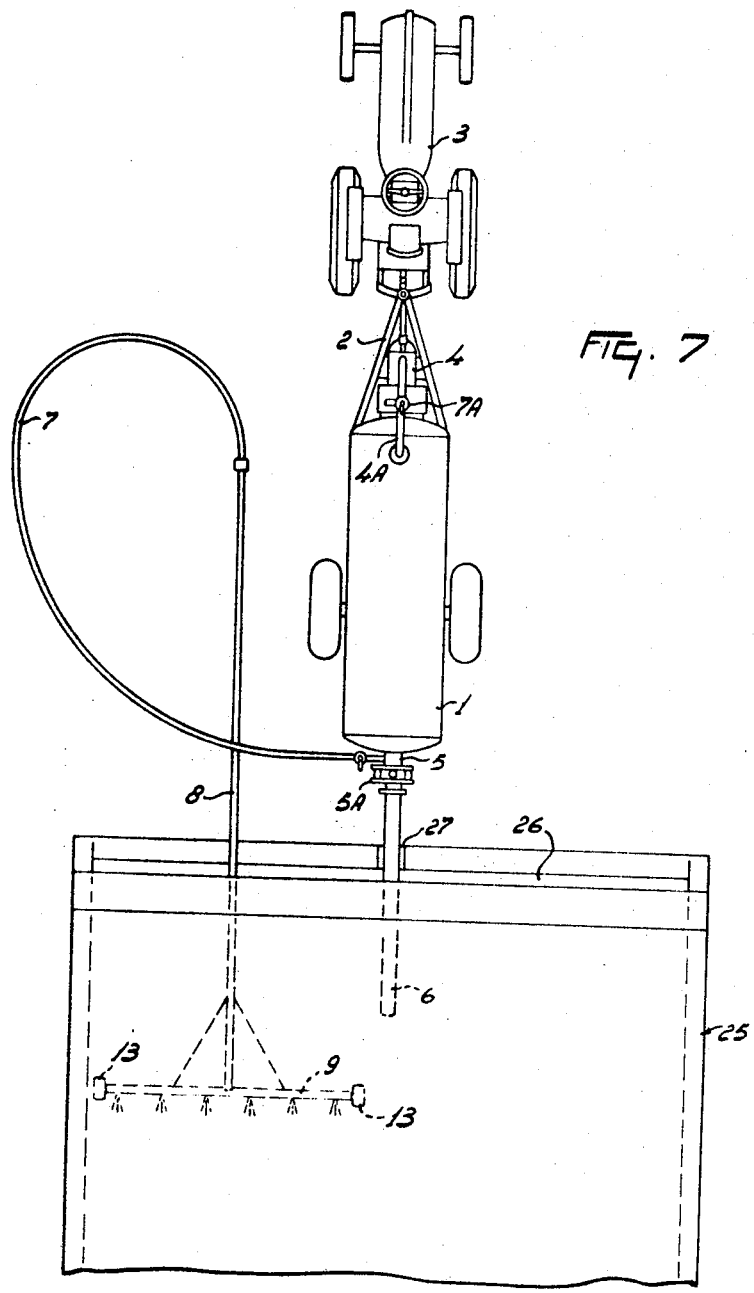

3,447,787
APPARATUS FOR THE STORAGE AND SPREADING OF LIQUID AND SEMI-LIQUID SUBSTANCES
Cornelis van der Lely, Zug, Switzerland, assignor to Lely Ltd., Burlington, Ontario, Canada
Filed Jan. 24, 1967, Ser. No. 611,357
Claims priority, application Netherlands, May 13, 1966, 6606560
Int. Cl. B01f 5/12; B65d 25/00
U.S. Cl. 259—95                                    19 Claims

ABSTRACT OF THE DISCLOSURE

Apparatus for the storage and spreading of semi-liquid organic manure and like substances comprising a transportable spreading implement and a stationary reservoir pit. A pipe and interconnected mouthpiece are provided for injecting turbulating air or water into the substance to facilitate its homogenous transfer from the reservoir to the implement, injection of the air or water being effected by a pump on the implement.

---

This invention relates to apparatus for the storage and spreading of liquid and semi-liquid substances, such as, for example, organic manures, sludge and slush. It is known to employ apparatus comprising a transportable spreading implement in association with a stationary liquid or semi-liquid reservoir for such purposes. However, when semi-liquid substances of this kind have been in storage for any length of time, they almost invariably form a thick crust and settle out to some extent. This results in a non-homogenous substance which it is difficult to pump from the reservoir to the container of the transportable spreading implement.

An object of the invention is to improve the known apparatus in such a way that the difficulties encountered with semi-liquid substances that have been stored for some time are overcome or at least reduced.

The invention resides in the provision of at least one pipe to which an elongated mouthpiece for injecting turbulating fluid into the reservoir is connected, means being provided on the transportable spreading implement to pump fluid to said mouthpiece by way of said pipe.

Figure 1:
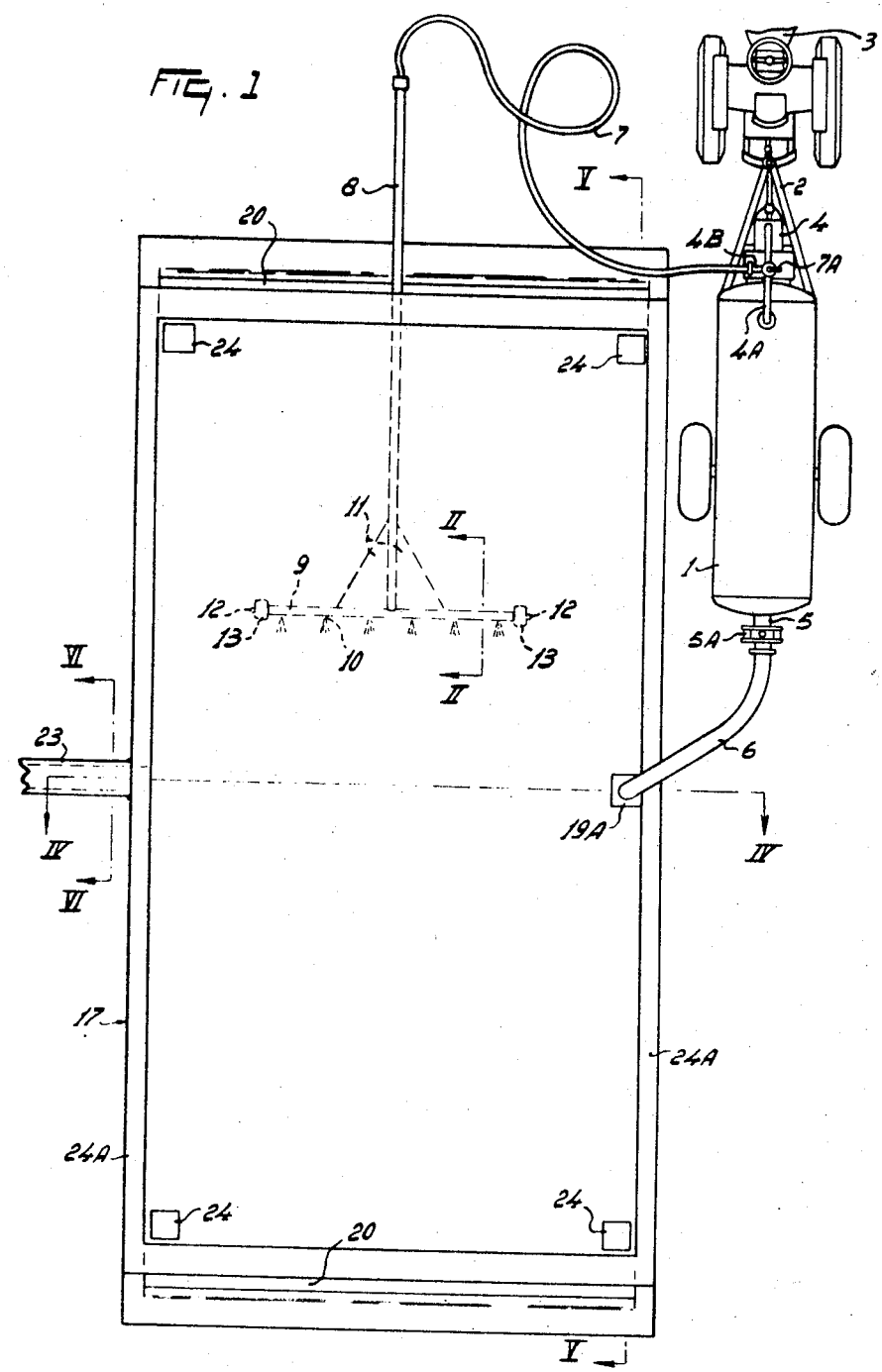
Figure 2:
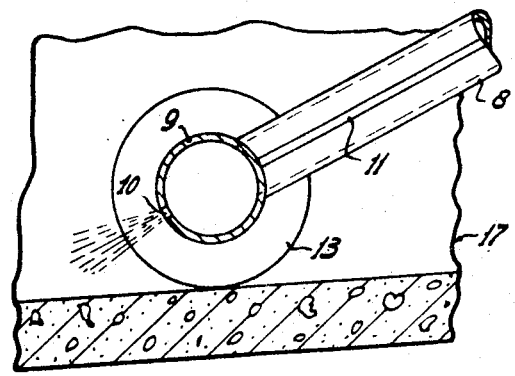
Figure 3:
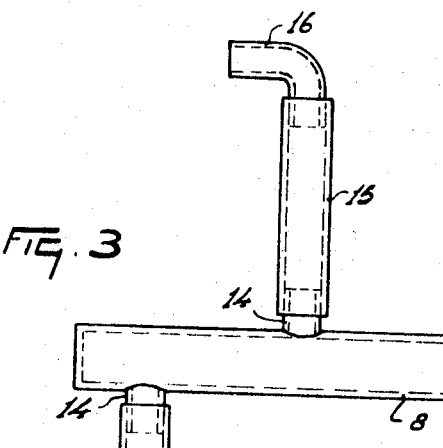
Figure 6:
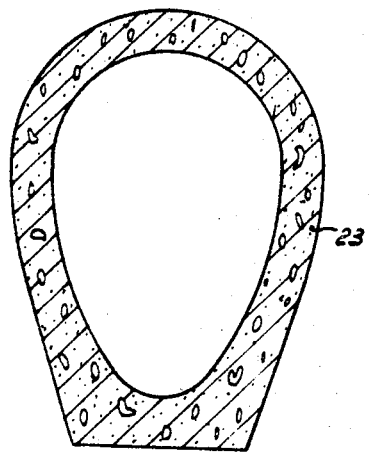
Figure 4:
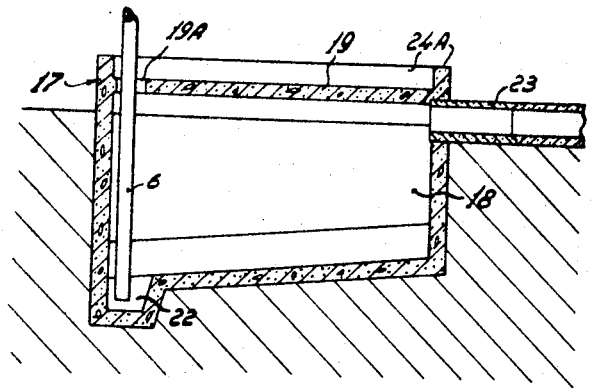
Figure 5:
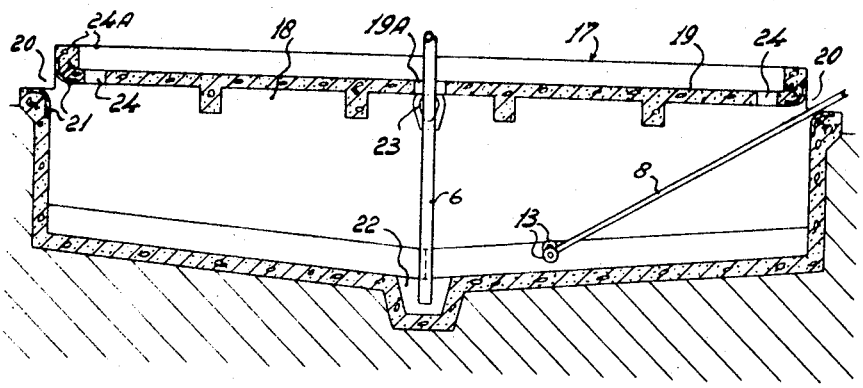
Figure 8:
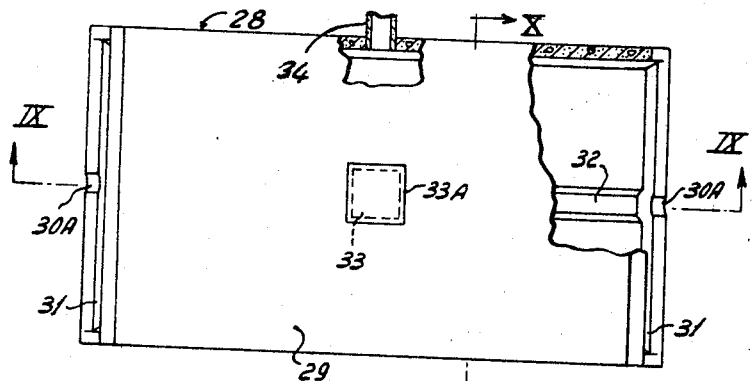
Figure 9:
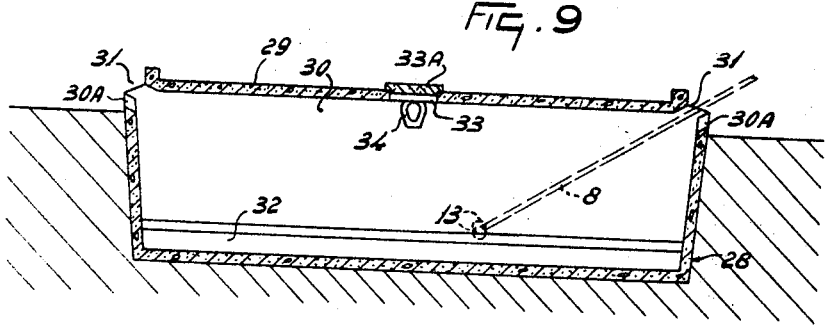
Figure 10:
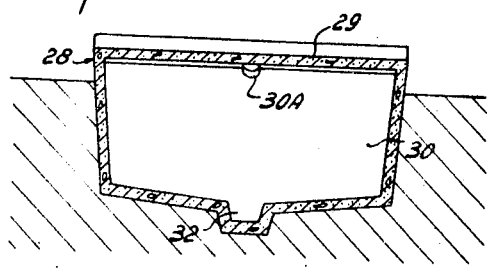

For a better understanding of the invention, and to show how the same may be carried into effect, reference will now be made, by way of example, to the accompanying drawings, in which:

FIGURE 1 is a plan view of apparatus in accordance with the invention comprising a transportable spreading implement and a stationary reservoir for liquid and semi-liquid substances, FIGURE 2 is a section, to an enlarged scale, taken on the line II—II of FIGURE 1, FIGURE 3 illustrates an alternative construction of certain parts which can be seen in FIGURES 1 and 2, FIGURE 4 is a section taken on the line IV—IV of FIGURE 1, FIGURE 5 is a section taken on the line V—V of FIGURE 1, FIGURE 6 is a section, to an enlarged scale, taken on the line VI—VI of FIGURE 1, FIGURE 7 corresponds to FIGURE 1 but shows an alternative construction of certain parts, FIGURE 8 is a plan view of an alternative form of stationary reservoir for liquid and semi-liquid substances, FIGURE 9 is a section taken on the line IX—IX of FIGURE 8, FIGURE 10 is a section taken on the line X—X of FIGURE 8, FIGURE 11 is a plan view of a third embodiment of a stationary reservoir for liquid and semi-liquid substances, FIGURE 12 is a section taken on the line XII—XII of FIGURE 11, and FIGURE 13 is a plan view, to an enlarged scale, showing an alternative construction of a member for the supply of fluid to the reservoirs.

Referring to the drawings, the apparatus which is shown in FIGURES 1 and 7 includes a transportable spreading implement and a stationary reservoir for liquid and semi-liquid substances such as organic manure, sludge and slush. The transportable spreading implement has a container in the form of a tank 1 which is mounted on a frame 2 that is provided with ground wheels to enable it to be transported from one place to another by an agricultural tractor 3 or other suitable towing vehicle. A double-acting pump 4 is mounted at the leading end of the frame 2 and can be arranged to be driven by the power take-off shaft of the tractor 3, as shown in outline in the drawings, or, alternatively, may be driven by an independent electric motor or internal combustion engine. The double-acting pump 4 has a vacuum side and a pressure side and is connected by a duct 4A to the interior of the tank 1 in an upper and forward region of that tank. A cock which is not visible in the drawings enables the duct 4A to be placed in communication with either the vacuum side or the pressure side of the pump 4. An opening 5 is provided in a lowermost region of the rear end of the tank 1, said opening being closed by a shut-off valve or other member 5A. A suction hose 6 can be connected to the opening 5 or said hose 6 can be removed and replaced by a spreading member (not shown) for use in spreading liquid and semi-liquid materials contained in the tank 1 over the surface of the ground.

In the embodiment illustrated in FIGURE 1 of the drawings, a flexible hose 7 is connected to a tube 4B that constitutes the third branch of a three-way valve 7A which is disposed in the duct 4A interconnecting the pump 4 and the tank 1. The end of the hose 7 remote from the tube 4B is connected to a rigid pipe 8 that is preferably made of aluminium and that conveniently has a diameter of 3.75 centimeters. The pipe 8 preferably has a length which is not less than that of the tank 1 and, at the end thereof which is remote from the hose 7, a mouthpiece is provided. The mouthpiece is afforded by a substantially horizontally extending tube 9 that is perpendicular to the pipe 8 and whose midpoint is in open communication with the end of said pipe. As can be seen in FIGURES 1 and 2 of the drawings, the side of the tube 9 which is remote from the pipe 8 is formed with a number of holes 10. The tube 9 preferably has a length of not less than about 1 meter and it is preferred that this length should be between 1 and 3 meters. The holes 10 are preferably spaced apart from one another by distances of not less than about 10 centimeters and it is preferred that they should be spaced apart from one another by distances of about 40 centimeters. It is preferred that each hole 10 should have a diameter of not less than 1.25 centimeters. Triangular strengthening plates 11 interconnect the pipe 8 and the tube 9 to reduce the likelihood of failure of the point between said pipe and said tube. Wheels 13 are rotatably mounted on axles 12 fastened to the opposite ends of the tube 9, the axes of rotation of the wheels 13 extending substantially parallel to the longitudinal axis of the tube 9.

FIGURE 3 of the drawings shows an alternative construction to that illustrated in FIGURES 1 and 2 in which the tube 9 is omitted and the corresponding end of the pipe 8 is closed. The tube 8 is, instead, provided with two branch pipes 14 that project perpendicularly from said tube in relatively opposite directions and at locations along the tube 8 which are spaced from one another. The free ends of the two branch pipes 14 are connected to short lengths of flexible hose 15 and the free ends of the hoses 15 are, in turn, connected to the ends of right-angled elbow pipes 16. As can be seen in FIGURE 3 of the drawings, the open ends of the elbows 16 face in relatively opposite directions.

The stationary reservoir for liquid and semi-liquid substances is in the form of a pit or tank 17. The pit 17 encloses a rectangular volume of space 18 which is located below ground level to a large extent and which is closed by a cover 19. The cover 19 is mounted in such a way that slots 20 (FIGURES 2 and 5) are formed along its shorter edges between those edges and upright walls of the space 18. The opposite sides of the slots 20 are lined by metal strips 21 that are preferably formed from aluminium. The bottom of the pit 17 is formed with a well 22 that is located approximately centrally of the lower edge of one of the longer upright walls of said pit. As can be seen in FIGURES 4 and 5 of the drawings, the bottom of the pit 17 is inclined downwardly towards the well 22. An opening 19A is formed in the lid 19 vertically above the well 22, a lid (not shown) being provided for the opening 19A when the latter is not in use with the suction hose 6. A supply pipe 23 opens into the pit 17 immediately beneath its cover 19 at a point diametrically opposite to the well 22. Liquid and semi-liquid substances which are to be stored in the pit 17 can be introduced into the same by way of the supply pipe 23. It can be seen in FIGURE 6 of the drawings that the pipe 23 is of ovoid cross-section. It has been found that this configuration reduces the risk of blockage of the pipe 23.

In the use of the apparatus which has so far been described, a liquid or semi-liquid material such as organic manure, sludge or slush which has been supplied through the pipe 23 to the pit 17 for storage can be sucked into the tank 1 of the transportable spreading implement by placing said tank in communication with the vacuum side of the pump 4 with the aid of the duct 4A, the three-way valve 7A and the cock (not shown) which has previously been mentioned. The suction hose 6 is connected to the opening 5 by way of the shut-off valve 5A, which is opened, and the substance in the pit 17 is then sucked into the tank 1 by the pump 4. The suction hose 6 extends right down into the well 22 so that, when required, the pit 17 can be completely emptied. If the substance has been standing in the pit 17 for some time, it will usually have formed a thick crust and will have settled out to a greater or lesser extent. Under these circumstances, the substance is rendered more homogenous prior to being sucked into the tank 1 by the use of the mouthpiece afforded by the tube 9. The flexible hose 7 is connected to the tube 4B and the tube 9 and pipe 8 are entered through one of the slots 20 at one end of the pit 17. The three-way valve 7A and the aforementioned cock (not shown) are arranged to connect the pressure side of the pump 4 to the hose 7 so that, upon driving said pump, air will be forced out of the holes 10 in the tube 9 and this will tend to break up the crust and re-mix it and settled out material with the more-liquid part of the substance. The tube 9 can be moved to and fro on its wheels 13 across the bottom of the pit 17 by manual manipulation of the end of the pipe 8 that projects from the slot 20. It will be apparent that this movement will cause the pipe 8 to tend to break up the crust on the substance and will allow the jets of air from the holes 10 to act upon the substance throughout the space 18. Obviously, the mouthpiece can be inserted through both the slots 20 in turn to enable the whole of the space 18 to be influenced thereby. As soon as the substance has been rendered more or less homogenous throughout, it can be sucked into the tank 1 by way of the hose 6 in the manner previously described.

It will be obvious that also a valve may be provided by which the pressure side of the pump can be connected with the pipe 8, whereas at the same time the suction side of the pump is connected with the hose 6. Thus during stirring of the substance, the same can already be sucked in the tank 1.

As can be seen in FIGURES 1, 4 and 5 of the drawings, upright walls 24A having a height of about 30 centimeters surround the cover 19, said cover being formed adjacent its four corners with corresponding square holes 24. Organic manure mixed with straw can be piled on the upper side of the cover 19 so that the liquid and semi-liquid constituents of this mixture will drain through the holes 24 into the pit 17. When the pipe 8 is modified as illustrated in FIGURE 3 of the drawings, air emanating from the open ends of the elbows 16 will cause the flexible hoses 15 to perform irregular oscillatory movements which will tend to break up the crust and settled-out material in the substance and re-mix the same with the more liquid constituents thereof.

The embodiment illustrated in FIGURE 7 of the drawings is basically similar to the one which has already been described and, therefore, parts which are similar, or identical, to previously described parts are indicated in FIGURE 7 by the same reference numerals as are employed in FIGURES 1 to 6. In this case, a reservoir in the form of a pit or tank 25 is formed along one of its longer edges with a slot 26 at the center of which a larger opening 27 is provided. The suction hose 6 can be entered through the opening 27 to reach into a gutter-shaped well (not shown) formed in the bottom of the pit 25. The opening 5 of the tank 1 of the transportable spreading implement is formed with a branch pipe 5B having its own shut-off valve 5C. As illustrated in FIGURE 7, the flexible hose 7 can be connected to the mouth of the branch pipe 5B as an alternative to the tube 4B. With this arrangement, water can be pumped into the pit 25 by way of the tube 9 as an alternative to air. The tank 1 is first filled with clean water with the aid of the suction hose 6 whereafter the aforementioned cock and three-way valve 7A are adjusted so that the pressure side of the pump 4 is connected to the tank 1 by way of the duct 4A. The shut-off valve 5A is closed and the shut-off valve 5C is opened so that, upon driving the pump 4, clean water from the tank 1 will be forced into the pit 25 through the holes 10 in the tube 9. The solid and semi-solid constituents of the substance in the pit 25 are softened, broken up and mixed by the clean water and the whole substance is diluted so that it can subsequently be sucked from the pit 25 into the tank 1 by way of the hose 6.

FIGURES 8 to 10 show a stationary reservoir for liquid and semi-liquid substances in the form of a pit or tank 28 that is rectangular in plan. Slots 31 are formed along the shorter upper edges of the rectangular space 30 defined by the walls of the pit 28 through which slots the pipe 8 and mouthpiece which it carries can be inserted. It will be evident from FIGURES 9 and 10 of the drawings that the greater part of the pit 28 is located below ground level. The pit 28 has a cover 29 which affords the upper edges of the slots 31. A gutter-shaped well 32 extends centrally across the bottom of the pit 28 between the two shorter sides of the latter and the regions of the bottom of said pit which are located on opposite sides of the well 32 are inclined downwardly towards the well. A square hole 33 is formed centrally of the cover 29 in register with the well 32 which latter extends parallel to the longer sides of the pit 28. The hole 33 has a cover 33A which can be removed to allow the liquid and semi-liquid constituents to drain into the pit 28 from mixtures of organic manure and straw, such as farmyard manure, stacked on the cover 29. A supply pipe 34 which is of similar cross-section to the previously described supply pipe 23 (see FIGURE 6) opens into the pit 28 immediately beneath the cover 29 at a point midway along one of the longer sides of the pit. Both the slots 31 are formed midway along their lower edges with larger openings 30A through which the suction hose 6 can be entered. It will be noted that the larger openings 30A are in register with the well 32 so that the suction hose 6 can completely drain the pit 28.

FIGURES 11 and 12 of the drawings show a further alternative stationary reservoir for liquid and semi-liquid substances in the form of a pit or tank 35 which is substantially identical in construction to the pit or tank 28 that has already been described. The only difference of any moment is that, in this case, the slots 31 are omitted. Two tubes 36 extend along the bottom of the pit 35, parallel to the longer sides of that pit, at relatively spaced locations to one side of the gutter-shaped well 32. A symmetrically similar pair of tubes 36 are located at the opposite side of the well 32. Each tube 36 has an upwardly bent portion 36A at one end and all four of the portions 36A extend through one of the shorter upright walls of the pit 35 near the uppermost edge of that wall and are connected by way of corresponding cocks 37 to a pipe 38 that is disposed perpendicular to the four tubes 36 and to the length of the well 32. The pipe 38 is connected to a rigid elbowpipe 39 which, in turn, is connected to a flexible hose 40. The free end (not shown) of the hose 40 can be connected to either the tube 4B or the branch pipe 5B that have previously been described. Each tube 36 is closed at the end remote from its portion 36A and is formed with a number of small holes 41 that are spaced apart from one another along the length of the tube.

Air can be introduced into the liquid or semi-liquid substance contained in the pit 35 by way of the holes 41 so that any crust floating on the substance, and any material which has wholly or partially settled out therefrom, is broken up and re-mixed with the more liquid part of the substance. As an alternative, clean water can be introduced through the holes 41, the water having substantially the same action as air but also acting to dilute the substance so that subsequent extraction from the pit 35 by way of the hose 6 is facilitated.

FIGURE 13 shows an alternative form of mouthpiece in which the pipe 8 has a diameter of about 3 centimeters and a length of about 3 meters while the relatively perpendicular tube 9 has a length of about 90 centimeters the holes 10 with which it is formed being spaced apart from one another by distances of about 5 centimeters each.

The apparatus which has been described enables semi-liquid substances, which are generally covered with a thick crust if they have been stored for any length of time, to be prepared by re-mixing prior to supply to the tank of the transportable spreading implement. The formations of the reservoirs that have been described are such that a fluid such as air or water can be introduced without difficulty to effect the mixing which has just been mentioned. Moreover, the reservoirs can be substantially completely emptied when required.

What we claim is:

1. An apparatus for the storage and spreading of liquid and semi-liquid material comprising a transportable spreading implement for spreading said material on the fields in combination with stationary reservoir means for such material, said spreading implement being in communication with the material in said reservoir through pipe means, said pipe means having an elongated mouthpiece for injecting turbulating fluid into said material in said reservoir, pump means on said spreading implement to pump fluid to said mouthpiece.

2. An apparatus as claimed in claim 1, wherein said mouthpiece is a tube transversely secured to said pipe, said tube having a length of about one meter.

3. An apparatus as claimed in claim 2, wherein said pipe and said tube are secured to one another in substantially perpendicular relationship and said tube has a plurality of holes spaced apart from one another along the length of said tube, said holes being located at the side of said tube remote from the side thereof secured to said pipe.

4. An apparatus as claimed in claim 3, wherein each of said holes is formed to have a diameter of about 1.25 centimeters.

5. An apparatus as claimed in claim 3, wherein said holes are placed at locations spaced apart from one another by distances of about 10 centimeters.

6. An apparatus as claimed in claim 1, wherein said mouthpiece includes a flexible element and an interconnected angular member defining a mouth for the release of fluid.

7. An aparatus as claimed in claim 1, wherein said pump means is a double-acting pump, and said pipe is adapted for connection to the pressure side of said pump, said pump being able to pump fluid from said transportable spreading implement to said mouthpiece through said pipe.

8. An apparatus as claimed in claim 1, wherein said mouthpiece is connected to at least one apertured tube mounted within said reservoir, at least four apertured tubes being located within said reservoir.

9. An apparatus as claimed in claim 8, wherein said four tubes extend parallel to one another and are spaced apart from one another, said tube being located at the bottom of said reservoir.

10. An apparatus as claimed in claim 8, wherein said tube is connected to said mouthpiece by way of a cock.

11. An apparatus as claimed in claim 1, wherein said reservoir is underground and provided with a cover, said apparatus having entrance means for permitting the insertion of said pipe means into said reservoir.

12. A stationary reservoir for liquid and semi-liquid manure or the like, said reservoir being provided with a cover, slot means being formed between said cover and said reservoir along at least one of their respective adjacent edges through which turbulating means can be introduced into said reservoir, said turbulating means including a pipe connected to a mouthpiece, said pipe being connected to a pump for supplying fluid to said mouthpiece.

13. A stationary reservoir as claimed in claim 12, wherein said reservoir is of rectangular shape and two slots are located at the two shorter sides of said reservoir.

14. The reservoir as claimed in claim 12, wherein a supply inlet is defined at one side of said reservoir, and a withdraw opening is provided at a relatively opposite side thereof, the supply inlet being located adjacent the uppermost edge of an upright side wall of said reservoir, said supply inlet being ovoid in cross section.

15. The reservoir as claimed in claim 12, wherein the bottom of said reservoir is shaped to define a well.

16. The reservoir as claimed in claim 15, wherein said well is located adongside one upright wall of the reservoir.

17. The reservoir as claimed in claim 15, wherein said well is defined approximately centrally of the bottom of said reservoir.

18. The reservoir as claimed in claim 15, wherein said well is gutter-shaped and the bottom of said reservoir is inclined downwardly towards said well.

19. The reservoir as claimed in claim 12, wherein said cover defines an opening which can receive a section tube for removing liquid and semi-liquid manure or the like from said reservoir, said opening being located in vertical register with said well.

References Cited

UNITED STATES PATENTS

| | | | |
|---|---|---|---|
| 2,135,261 | 11/1938 | Rosmait | 259—95 X |
| 2,192,115 | 2/1940 | Ware | 259—95 |
| 2,531,760 | 11/1950 | Woolsey | 259—95 X |
| 3,125,537 | 3/1964 | Martin | 259—4 X |
| 3,233,874 | 2/1966 | Betulius | 259—95 |

FOREIGN PATENTS

| | | |
|---|---|---|
| 249,792 | 4/1926 | Great Britain. |
| 764,148 | 12/1956 | Great Britain. |

ROBERT W. JENKINS, *Primary Examiner.*

U.S. Cl. X.R.

220—85